UNITED STATES PATENT OFFICE.

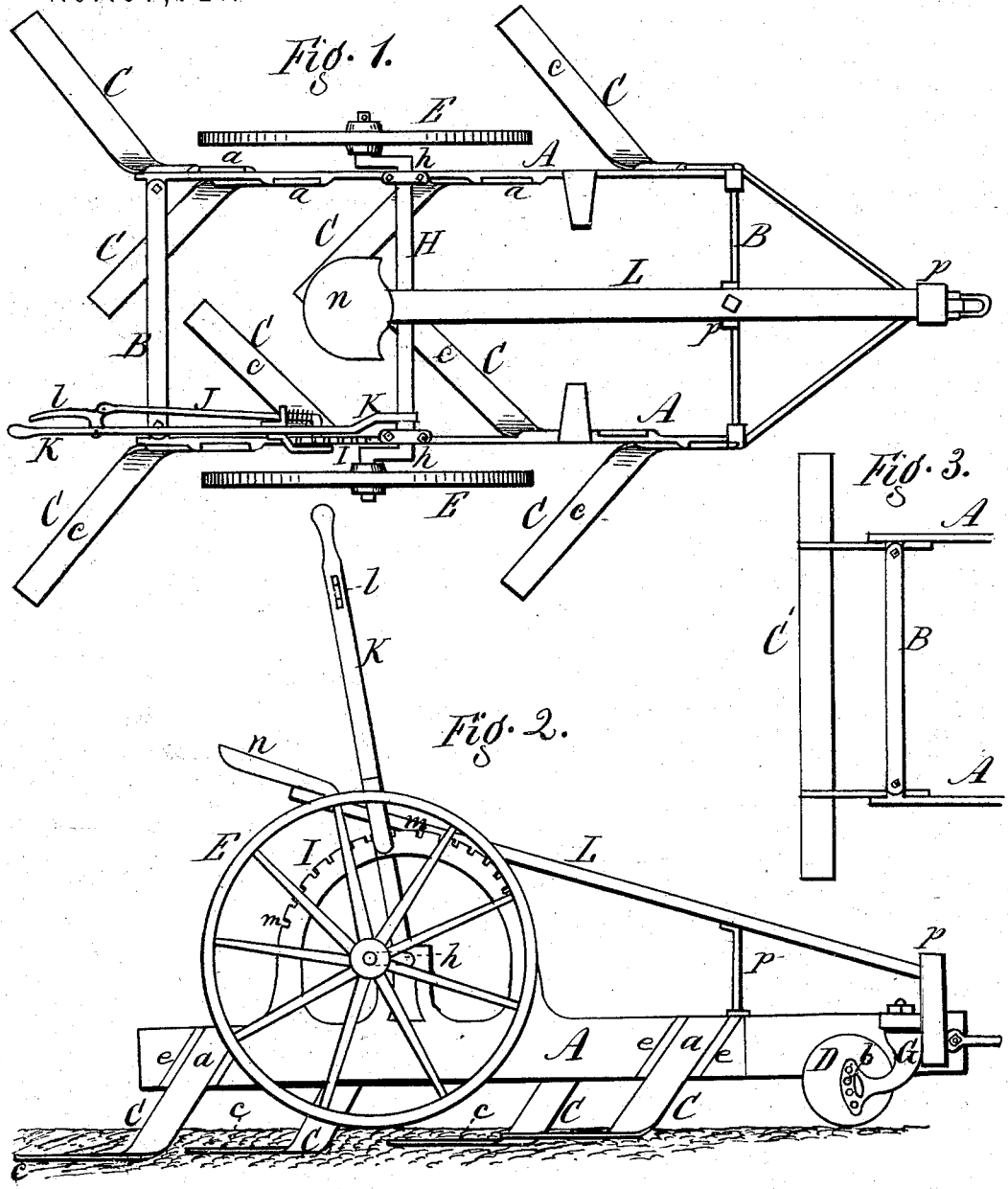

WILLIAM P. MUNGER, OF BERGEN, NEW YORK.

IMPROVEMENT IN CULTIVATORS.

Specification forming part of Letters Patent No. 157,721, dated December 15, 1874; application filed June 30, 1873.

*To all whom it may concern:*

Be it known that I, WILLIAM P. MUNGER, of Bergen, in the county of Genesee and State of New York, have invented a certain new and useful Improvement in Cultivators; and I do hereby declare that the following is a full, clear, and exact description of the construction and operation of the same.

My invention consists of a cultivator having angular knives or blades, graduating in depth from front to rear, and otherwise arranged to operate as hereinafter described.

In the drawings, Figure 1 is a plan. Fig. 2 is an elevation. Fig. 3 is a detail view.

A A are the two sides of the frame, which may be of wood or iron, and B B are cross-pieces connecting the same. These cross-pieces may be arranged to expand or contract the width of the cultivator to do different kinds of work. In the large-sized cultivators the machine is mounted on wheels E E, whose axle H has cranks $h$ $h$, on which the wheels rest. By turning the axle it will be seen that the cranks will be turned up or down, and the frame will be correspondingly raised or lowered upon the wheels. By this means the vertical adjustment of the cultivator is attained, and also the knives or cutters are carried over stones or other obstructions. K is a lever made fast to the axle, and by turning which, either forward or backward, the axle is turned to produce the adjustment just described. I is a notched segment attached to the frame. The lever has a handle, $l$, which operates a spring-rod, J, the lower end of which falls into the notches $m$ of the segment, and thus retains the lever at any adjustment. To produce the adjustment the operator seizes the handle $l$, which disengages the spring-rod from the notches, and the lever is then thrown in one direction or the other, which elevates or depresses the frame upon the wheels. L is a spring-bar resting within and upon the standards $p$ $p$, and sustaining the driver's seat $n$. D is a caster-wheel at the front end of the machine, attached to the swiveled bearing G, so as to turn in any direction. The lower end of the bearing is made with a segment, which has a series of holes, $b$ $b$, in which the caster-wheel may be adjusted higher or lower. But little adjustment of the front end of the machine is required; and the main object of the rear adjustment upon the wheels E E is to gage the cut of the rear knives and to enable the machine to pass obstructions, as will presently be described. In going into the field a tongue is employed, which slips through the front standard $p$, and connects with the rear standard $p$ in any desired manner. C C C are the knives or cutters, which form the essential feature in my invention. They are made from strips of steel or iron of such size as to insure proper strength. The upper ends $a$ $a$ are bent up, so as to be secured to the sides A A of the frame, while the lower ends $c$ $c$ project horizontally and form the cutting-surfaces, the front edges being made sharp-edged for the purpose. The ends $a$ $a$ may rest between lugs $e$ $e$ of the frame for giving additional strength to the bolting. The horizontal ends $c$ $c$ project backward angularly, as shown in the drawings, and those upon the inside of the machine lap a little past each other on opposite sides, so as to make the full width of cut; and they also alternate in position, having thus somewhat of a zigzag form. I apply these knives upon both sides of the frame—inside and out—as shown. In addition to the above, the knives graduate in depth of cut from front to rear, the front ones being near the surface and the rear ones at considerable depth. This is an essential feature, as will be presently explained. I also design, in some instances, to use a straight knife, C', in the rear, which extends across the machine, as shown in Fig. 3.

In small-sized cultivators I do not employ wheels, except a caster-wheel in front, but use handles, and make the sides of the cultivator expansible in the rear, as usual. I employ the knives C C C, however, attached to the sides in the manner above described, having, in addition, a double-winged tooth or cutter in advance.

The knives, standing in an inclined position backward, as described, and alternating in position and lapping each other, cut the whole surface of the ground and throw the weeds over the top. All sods and grasses which do not pass over, center between the knives in a line, and work back, and are discharged at the rear by the incline of the knives. This incline effectually prevents clogging by allowing the sods to drag off, being more effective in this result than square knives or ordinary teeth, which gather the sods in a body, and frequently require the raising of the cultivator for clearing. The graduating of the depth of the knives from front to rear is also important, as thereby the soil is cut in thin sheets by the several sets of knives in succession, requiring less power in operating the machine, and pulverizing the soil more thoroughly, than if all the knives cut at the same depth.

The large machine is particularly valuable for summer fallowing, and the small one for cultivating all kinds of crops. The large one is also used for cultivating where the rows are wide apart. Both are effective for harvesting beans, the shape and position of the knives being such as to run under the hills and remove the vines from the soil without shattering.

In cultivating with the small machine, take off all the outside knives and use only the inside ones. The bends in the knives, being curved, allow the knives to run close to the plants without injury. In harvesting beans, take off all the knives of the large machine except two of the inner ones, and all of the knives of the small machine except two of the outer ones. These two knives, running under the hills, do all the work.

When used for harvesting beans the large machine should be made wider than for ordinary work. The small machine should also be stayed in its upright position, and prevented from drifting, by a cutter attached to the beam opposite the two knives.

Having thus described my invention, what I claim as new, and desire to secure by Letters Patent, is—

The combination, with the cultivator-frame A A, of the series of angular knives C C C, arranged in alternate positions, and lapping each other on the inside, and graduated in depth from front to rear, as and for the purpose specified.

In witness whereof I have hereunto signed my name in the presence of two subscribing witnesses.

WM. P. MUNGER.

Witnesses:
R. F. OSGOOD,
HENRY M. THOMAS.